F. P. SMITH.
OPERATING DEVICE FOR WASHING MACHINES.
APPLICATION FILED APR. 20, 1920.
1,403,204.
Patented Jan. 10, 1922.
2 SHEETS—SHEET 1.
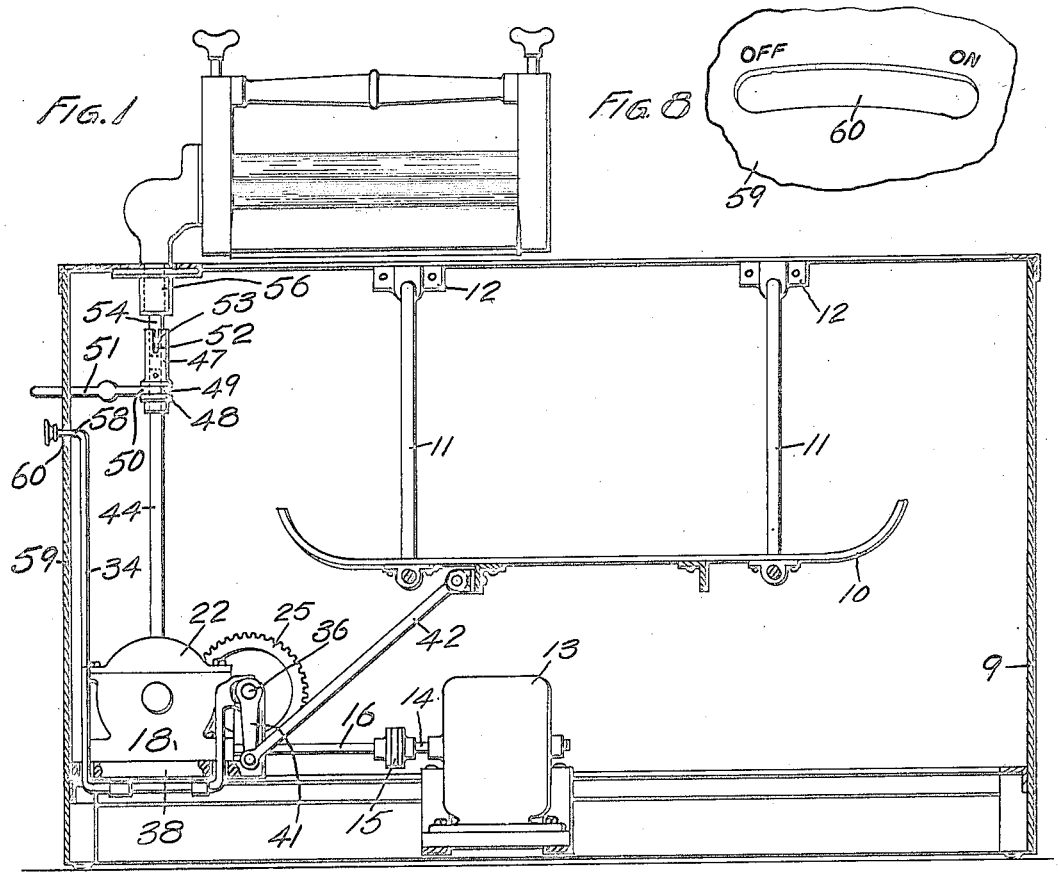
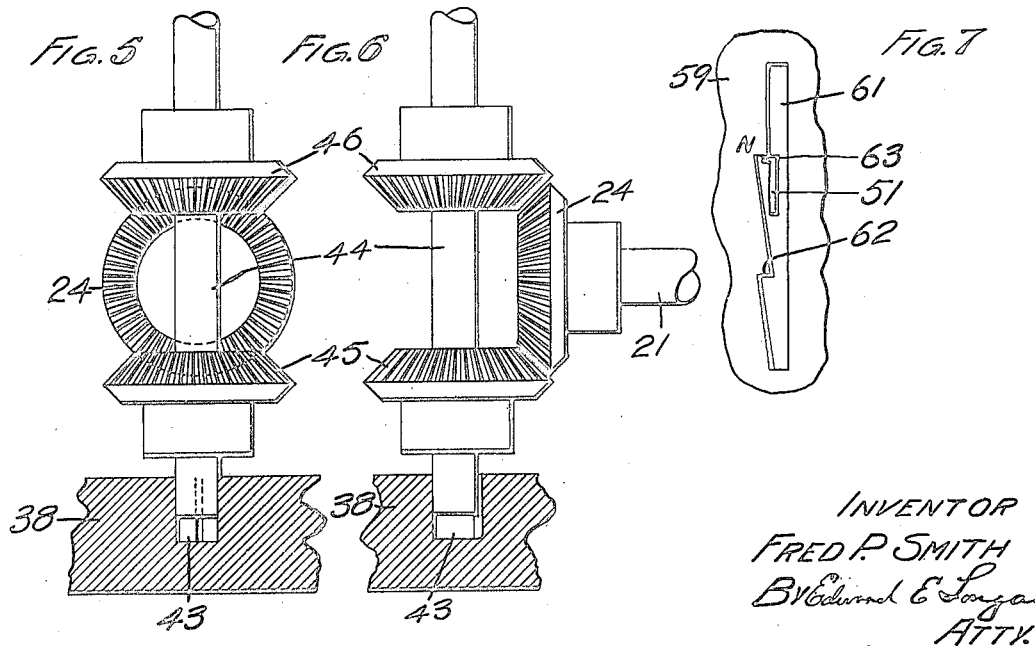
INVENTOR
FRED P. SMITH
By Edward E. Longan
ATTY.

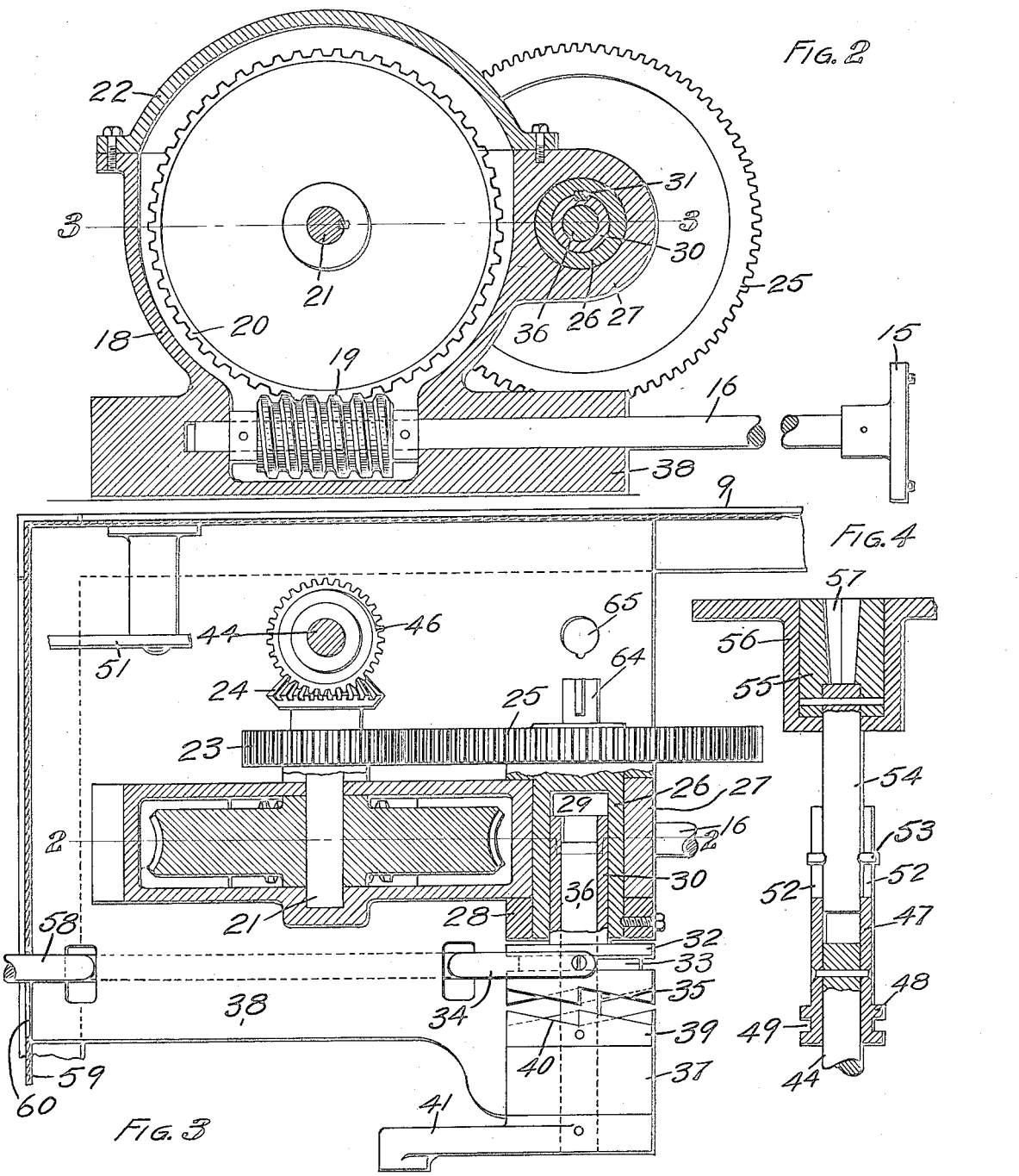

UNITED STATES PATENT OFFICE.

FRED P. SMITH, OF ST. LOUIS, MISSOURI.

OPERATING DEVICE FOR WASHING MACHINES.

1,403,204.

Specification of Letters Patent. Patented Jan. 10, 1922.

Application filed April 20, 1920. Serial No. 375,266.

*To all whom it may concern:*

Be it known that I, FRED P. SMITH, a citizen of the United States of America, and a resident of the city of St. Louis and State of Missouri, have invented certain new and useful Improvements in an Operating Device for Washing Machines, of which the following is a specification containing a full, clear, and exact description, reference being had to the accompanying drawings, forming a part thereof.

My invention relates to improvements in washing machines, and has for its primary object a mechanism whereby the clothes container is reciprocated and the wringer operated without the use of any belt connections.

A further object is to construct a power driven washing machine in which the driving mechanism is so arranged that either a reciprocating motion or rotary motion may be obtained, simultaneously or independently.

A still further object is to construct a washing machine which is power driven and which is so arranged that the wringer can be readily removed and the top of the machine covered with a board and used as a table.

In the drawings,—

Fig. 1 is a vertical-longitudinal view of my device;

Fig. 2 is an enlarged view of the driving mechanism taken on the line 2—2 of Fig. 3;

Fig. 3 is a horizontal section taken on the line 3—3 of Fig. 2;

Fig. 4 is a fragmental sectional view of a portion of the wringer-driving mechanism;

Fig. 5 is a face view of the lower portion of the wringer-driving mechanism;

Fig. 6 is a side view of the same;

Fig. 7 is an end view of the shifting lever for placing the wringer in and out of operation; and Fig. 8 is a view of the upper portion of the casing showing the opening through which the lever for throwing the reciprocating device into and out of operation projects.

In the construction of my device, 9 represents the casing, which is of ordinary construction. To the casing 9 is hingedly connected the cradle 10, on which the tub proper rests. This cradle is swingingly supported by the arms 11, which rest in bearings 12.

Near the lower end of the casing 9 is secured the motor 13, which has its shaft 14 provided with a coupling 15. This coupling is in turn secured to a shaft 16 which has bearing in a housing 18. Within the housing 18 and secured to the shaft 16 is a worm 19 which meshes with the worm wheel 20. This worm wheel is secured on the shaft 21, which also has bearing in the housing 18. The housing 18 is closed by means of a cap 22, the object of which is to prevent foreign substances from getting into the housing and ruining the worm drive. The shaft 21 extends through one side of the housing and is provided on its projecting end with the spur gear 23 and the beveled gear 24, the spur gear 23 meshing with the gear 25. This gear has an elongated hub 26 which projects through the ear 27 formed integral with the housing 18. The hub 26 is prevented from coming out of the ear 27 by means of the set collar 28. This hub is counter-bored as at 29, which counter bore receives the sleeve 30. The sleeve 30 is slidably secured within the counter bore by means of the key 31, and is provided on its outer end with an enlarged flange 32. This flange is provided on its surface with a groove 33 to receive one end of the shifter 34, and on its face with the teeth 35. The sleeve 30 and flange 32 are formed hollow, so as to permit the entrance of the shaft 36. This shaft has bearing in the sleeve 30 and in the boss 37, which is formed integral with the base plate 38 on which the housing 18 is secured.

On one side of the boss 37 and to the shaft 36 is secured the collar 39, this collar being provided with teeth 40 which are designed to engage with the teeth 35 and on the opposite side of the boss 37 is secured the crank arm 41. To this crank arm is secured the connecting rod 42, which in turn is secured to the cradle 10. This will impart a reciprocating movement to the cradle 10 when the crank arm 41 is rotated. The base 38 is provided with a counter bore 43 in which is mounted a shaft 44 and secured to the shaft 44 are bevel gears 45 and 46. These bevel gears are so spaced apart on the shaft that they can both be put out of mesh with the gear 24 when desired. This is clearly shown in Fig. 6, and thus by either raising or lowering the gears, one or the other, is brought into contact with the gear 24 and rotated. My object in having this reversing movement is to enable the operator to wring clothes either from the machine or into the machine.

Secured to the upper end of the shaft 44 is a sleeve 47, this sleeve being provided at its lower end with an enlargement 48, which is provided with a groove 49 and in this groove the forked end 50 of the shifting lever 51 operates. The upper end of the sleeve 47 is slotted, as indicated by the numeral 52, the slots 52 receiving the ends of the pin 53 which extends through the shaft 54. The shaft 54 is in turn secured to a cylindrical block 55. This block is mounted in the bearing 56 which is secured to the casing 9 in any well known manner. The block 55 is also provided with an opening 57. This opening is preferably rectangular in form but may be of any desired shape, its object being to act as a receiving socket for the driving shaft of the wringer, although I may, if desired, insert a shaft therein which has fan blades attached to it, and thus use this means for cooling the room. The shifter 34 has its end 58 projecting through the wall 59 of the casing 9. In this wall is formed the slot 60. This slot will tend to limit the throw of the shifting bar. The lever 51 extends through the slot 61 which is also formed in the wall 59. This slot has a series of teeth 62 formed in one side. The object of these teeth is to engage with the projection 63 formed on the lever 51. When the lever 51 is engaged with either of the teeth 62, the shaft 44 cannot move downward. This will hold the gears 45 and 46 in any desired position as when the lever is set in the tooth marked "N" in Fig. 7, the wringer operating device will be in neutral, that is, the gears 45 and 46 will not mesh with the gear 24. When the lever 51 is depressed the shaft 44 will be raised, bringing the gear 45 in mesh with the gear 24. This will drive the wringer in one direction and if the lever 51 is raised, a reverse drive of the wringer will result.

I may, if it is found desirable to have the wringer operate at a slower speed, form a short shaft or trunnion 64 integral with the gear 25 and secure the beveled gear 24 thereon and mount the end of the shaft 44 in the counterbore 65 which is formed in the base 38; this change however will not affect the operation of my device but is merely a matter of convenience.

Having fully described my invention what I claim is:

A washing machine comprising a casing, a cradle swingingly mounted in said casing, a motor secured within the casing, a housing mounted in said casing, a worm and worm wheel mounted within the casing, a shaft connecting said worm and motor for simultaneous rotation, a shaft secured to the worm wheel and projecting through one wall of the housing, a spur gear mounted on said shaft, a bearing formed integral with the housing, a hollow shaft located in said bearing, a spur gear formed integral with said shaft and meshing with the first mentioned spur gear, a sleeve slidably mounted in and keyed to the hollow shaft, a clutch member formed integral with one end of said sleeve, a shaft mounted in said sleeve, a clutch member secured to said shaft, a crank arm attached to said shaft, a connecting rod for securing the cradle and crank arm together, and a lever for throwing the clutch in and out of engagement.

In testimony whereof, I have signed my name to this specification.

FRED P. SMITH.